United States Patent [19]

Hulse et al.

[11] Patent Number: 5,063,066
[45] Date of Patent: Nov. 5, 1991

[54] DIETARY MODIFICTION TO ALLEVIATE TOXICITY IN LIVESTOCK CAUSED BY MYCOTOXINS

[75] Inventors: Sid D. Hulse, Marietta, Ga.; D. V. Maurice, Clemson, S.C.; Nelson E. Ward, Blairstown; David L. Wicker, Ringwood, both of N.J.

[73] Assignee: Degussa Corporation, Ridgefield Park, N.J.

[21] Appl. No.: 472,046

[22] Filed: Jan. 29, 1990

[51] Int. Cl.$^5$ .............................................. A23K 1/00
[52] U.S. Cl. ........................................ 426/2; 426/72; 426/623; 426/630; 426/656; 426/807
[58] Field of Search ...................... 426/2.72, 623, 656, 426/807, 630, 656; 435/224, 223, 219, 921

[56] References Cited

U.S. PATENT DOCUMENTS

| | | | |
|---|---|---|---|
| 4,035,518 | 7/1977 | Carmona et al. | 426/231 |
| 4,436,756 | 3/1984 | Canella et al. | 426/430 |
| 4,795,651 | 1/1989 | Henderson et al. | 426/456 |

OTHER PUBLICATIONS

Kryukov et al., "Effect of Adding Methionine to a Feed Mixture with Aflatoxin", Abstract No. 0323731, Dialog data base file 50.

Voigt et al., "Abnormal Concentrations of B Vitamins and Amino Acids on Plasma Bile & Liver of Chicks with Aflatoxicosis", Dialog database file 5 biosis, Abstract No. 71042374.

The Merck Index, Merck & Co Inc (1968) pp. 729-730, eighth edition.

Coffey, M. T., W. M. Hagler, Jr., and J. M. Cullen, "Influence of Dietary Protein, Fat or Amino Acids on the Response of Weanling Swine to Aflatoxin B$_1$", Journal of Animal Science (1989), vol. 67, pp. 465-472.

*Primary Examiner*—R. B. Penland
*Attorney, Agent, or Firm*—Beveridge, DeGrandi & Weilacher

[57] ABSTRACT

Adverse effects of mold-infested corn caused by mycotoxins are alleviated by including methionine and niacinamide in the diet of poultry.

8 Claims, No Drawings

5,063,066

DIETARY MODIFICTION TO ALLEVIATE TOXICITY IN LIVESTOCK CAUSED BY MYCOTOXINS

INTRODUCTION AND BACKGROUND

Mycotoxins from moldy grain can cause large economic losses to poultry and livestock producers. The present invention relates to dietary modification to alleviate the adverse effects of feeding mold-infested corn to livestock such as broiler chickens.

There are many different mycotoxins which cause contamination of feedstuffs. The mycotoxin that is a most concern to the poultry and livestock industry is aflatoxin. Much research has been devoted to understanding the specific metabolic effect of these toxins in order to take steps to modify or remedy animal poisoning and toxin stresses that may occur from a number of sources.

SUMMARY OF THE INVENTION

An object of the present invention is to provide a method for alleviating the adverse reaction in livestock, especially in poultry, which may be induced by feeding with mycotoxin contaminated feed grain.

A further object is to avoid the adverse effects of aflatoxin inadvertently introduced into the diet of livestock via field contaminated corn.

Another object of the invention is to improve the performance of poultry and avoid compromising the immune system thereof by a method of combating mycotoxins in moldy feed.

In achieving the above and other objects, one feature of the present invention resides in a method of providing supplemental methionine and niacinamide in a diet which will alleviate any adverse responses induced by the use of aflatoxin contaminated corn.

A further feature of the present invention resides in a composition of methionine and niacinamide and as a supplemental diet for livestock, especially poultry.

DETAILED EMBODIMENTS OF THE INVENTION

Day-old male broiler chicks (Indian River-Peterson) were obtained from a commercial hatchery (Strain Poultry Co., Gainesville, Ga.). Seven hundred and sixty-eight chicks were allocated at random to 24 floor pens in an open-sided broiler house with partial environment control. Each floor pen measured 2.8m$^2$ and housed 32 chicks to 3 weeks of age and 25 chicks to 31 days of age. The experiment was terminated when the birds were 31 days old. The mean minimum and maximum temperatures in the broiler house ranged from 20.2° to 25.5° C. during the experiment. Table 1 gives the temperature in the broiler house over the five week period.

TABLE 1

| Temperature (°C.) in the broiler house during the experiment | | |
|---|---|---|
| Week | Minimum | Maximum |
| 1 | 22.0 | 25.3 |
| 2 | 22.6 | 25.8 |
| 3 | 18.7 | 26.7 |
| 4 | 18.2 | 25.3 |
| 5 | 17.4 | 23.9 |

Basal experimental diets as shown in Table 2 were formulated with and without mold-infested corn to meet nutrient requirements of the broiler chick. Two samples of yellow corn were used. A mold-infested corn (natural field contamination) from Texas with a mean assay value of 768 mg aflatoxin (AF)/kg with 94% of the AF in the form of AFB$_2$ and a local sample of corn which tested negative for AF. Inclusion of the AF corn in diets was calculated to provide 450–500 mg AF/kg but actual analysis yielded a value of 306 mg/kg for the starter diet and 514 mg/kg for the finisher diet. In both series, the control diet was negative for AF. Additional dietary treatments with AF corn diets included supplemental methionine and niacinamide (0.1 and 0.3%).

TABLE 2

| Composition (%) of experimental diets[1] | | |
|---|---|---|
| Ingredients | Starter | Grower |
| Yellow corn | 59.50 | 68.23 |
| Soybean | 28.00 | 25.00 |
| Poultry by-product meal | 2.50 | — |
| Corn gluten meal | 2.50 | — |
| Poultry fat | 4.06 | 3.50 |
| Defl. phosphate | 1.75 | 1.70 |
| Ground limestone | 0.70 | 0.75 |
| D,L-methionine | 0.16 | 0.05 |
| Lysine-HCl (78%) | 0.06 | — |
| Salt | 0.40 | 0.40 |
| Vitamin premix | 0.25 | 0.25 |
| Trace mineral mix | 0.05 | 0.05 |
| Selenium mix | 0.02 | 0.02 |
| Amprol Plus | 0.05 | 0.05 |

| Calculated analyses of experimental diets | | | | |
|---|---|---|---|---|
| | Diet no. | | | |
| Item | 1 | 2 | 3 | 4 |
| Starter | | | | |
| ME (kcal/g) | 3.17 | 3.17 | 3.17 | 3.17 |
| Crude protein (%) | 22.02 | 22.02 | 22.27 | 22.24 |
| Lysine (%) | 1.17 | 1.17 | 1.17 | 1.17 |
| Methionine (%) | 0.55 | 0.55 | 0.87 | 0.87 |
| Cystine (%) | 0.34 | 0.34 | 0.33 | 0.33 |
| SAA (%) | 0.89 | 0.89 | 1.20 | 1.20 |
| Ether extract | 6.99 | 6.99 | 7.29 | 7.43 |
| Finisher | | | | |
| ME (kcal/g) | 3.18 | 3.18 | 3.18 | 3.18 |
| Crude protein (%) | 18.18 | 18.18 | 18.34 | 18.32 |
| Lysine (%) | 0.96 | 0.96 | 0.95 | 0.95 |
| Methionine (%) | 0.37 | 0.37 | 0.68 | 0.68 |
| Cystine (%) | 0.28 | 0.28 | 0.28 | 0.28 |
| SAA (%) | 0.65 | 0.65 | 0.96 | 0.96 |
| Ether extract | 6.34 | 6.34 | 6.57 | 6.57 |

[1]Within each series the following diets were formulated by appropriate adjustments.
Diet #1 - Control diet used aflatoxin (AF) negative corn
Diet #2 - Used AF contaminated corn
Diet #3 - Used AF contaminated corn and supplemented with methionine and 0.1% niacinamide.
Diet #4 - Used AF contaminated corn and supplemented with Methionine and 0.3% niacinamide.

Body weight and feed consumption were measured at 31 days of age. Both measurements were on a pen basis and feed was withdrawn for about 12 hours prior to weighing to minimize variation due to differences in gut fill. At termination, five birds were sampled from each pen for autopsy and blood samples drawn for albumin and amino acid analyses. Samples of birds from each treatment were injected (i/p) with 1 ml of a 20% sheep red blood cells suspended in phosphate buffered saline. The challenged birds were bled a week after injection and plasma samples will be tested for total antibody titer and for IgG and IgM.

The results of these experiments are summarized in Table 3 and interpreted below.

TABLE 3

Response of male broilers at 31 days of age to diets with or without aflatoxin (AF) contaminated corn and with supplements of methionine and niacinamide to the AF diets

| Response variable | Diet no. 1 | 2 | 3 | 4 | SEM |
|---|---|---|---|---|---|
| Body weight, d31 (g) | 1265$^A$ | 1190$^B$ | 1253$^A$ | 1249$^A$ | ±11.0 |
| Food: gain ratio | 1.855$^A$ | 1.926$^B$ | 1.838$^A$ | 1.847$^A$ | ±0.0083 |
| Plasma albumin | 2.91 | 2.91 | 2.97 | 2.71 | ±0.079 |
| Liver weight (g/100 g BW) | 2.28 | 2.21 | 2.33 | 2.28 | ±0.046 |
| Spleen weight (mg) | 114$^C$ | 123$^{CD}$ | 113$^C$ | 137$^D$ | ±6.28 |
| Liver dry matter (%) | 26.16 | 26.60 | 25.56 | 26.05 | ±0.285 |

$^{A,B}$Significantly differenc (P<.01).
$^{C,D}$Significantly different (P<.06).

Over the experimental period of day-old to 31 days inclusion of aflatoxin (AF) contaminated corn significantly (P<0.01) depressed growth by 6.3% and increased feed conversion (P<0.06) by 3.8% or 7 points. Supplementation of the AF corn diets with additional methionine and niacinamide completely alleviated the growth depression induced by aflatoxin.

Plasma albumin, relative liver weight, and liver dry matter were very similar on all diets and differences were not significant. In contrast, spleen weight increased by 7.9% when fed the AF corn diet without the additional methionine and niacinamide supplement. Spleen size was restored to normal when methionine and 0.1% niacinamide was included in the AF corn diets. Niacinamide at 0.3% significantly increased spleen weight.

The birds were individually examined for locomotor disorders and differences due to dietary treatments were not apparent. The autopsy results showed that neither AF nor the magadose of niacinamide induced gross visible changes such as ascites or hemorrhages.

Based on the foregoing data, it is concluded that the use of aflatoxin contaminated corn in broiler diets to the extent of 300-500 ppm AF depressed growth and efficiency of feed utilization. However, the adverse effect of 300-500 ppm AF, introduced in the diet of male broilers by the use of field contaminated corn, was completely alleviated by increasing dietary methionine (58% in the starter diet and 84% in the grower) in combination with niacinamide. The study demonstrated that sulfur amino acids in broiler diets at 1.33 times the NRC (1984) recommended level and 0.1% niacinamide supplement were effective modifiers of aflatoxicosis in male broilers.

Further variations and modifications of the foregoing will be apparent to those skilled in the art upon a review thereof and are intended to be encompassed by the appended claims.

We claim:

1. A method for alleviating adverse toxicity reactions in poultry induced by feeding mycotoxin contaminated feed comprising feeding said conventional poultry with a feed diet an and amount of methionine and niacinamide effective to alleviate said adverse toxicity reactions to mycotoxins in poultry.

2. The method according to claim 1 wherein the poultry is broiler chickens.

3. The method according to claim 1 wherein the contaminated feed contains aflatoxin.

4. The method according to claim 1 wherein the methionine is D,L-methionine.

5. The method according to claim 4, wherein the methionine is present in an added amount based on about 0.3% of the weight of the diet.

6. The method according to claim 1 wherein the niacinamide is present in the amount of 0.1% to 0.3% of the diet by weight.

7. A poultry feed diet consisting essentially of a conventional poultry feed diet and an amount of methionine and niacinamide effective to alleviate adverse toxicity reactions to mycotoxins in said poultry.

8. The poultry feed diet according to claim 7, wherein said mycotoxin is aflatoxin.

* * * * *